J. E. GENN.
MAGNETIC DAMPER FOR SPEEDOMETERS.
APPLICATION FILED FEB. 11, 1918.

1,367,690. Patented Feb. 8, 1921.

Inventor:
John E. Genn,
by Burton & Burton
his Attys.

UNITED STATES PATENT OFFICE.

JOHN E. GENN, OF CHICAGO, ILLINOIS, ASSIGNOR TO STEWART-WARNER SPEEDOMETER CORPORATION, OF CHICAGO, ILLINOIS, A CORPORATION OF VIRGINIA.

MAGNETIC DAMPER FOR SPEEDOMETERS.

1,367,690. Specification of Letters Patent. Patented Feb. 8, 1921.

Application filed February 11, 1918. Serial No. 216,641.

*To all whom it may concern:*

Be it known that I, JOHN E. GENN, a citizen of the United States, residing at Chicago, in the county of Cook and State of Illinois, have invented certain new and useful Improvements in Magnetic Dampers for Speedometers, of which the following is a specification, reference being had to the accompanying drawings, forming a part thereof.

This invention relates to measuring instruments in which the indicating member is delicately poised for oscillation in opposition to a relatively light, yielding resistance, so that bodily vibration or shock to the instrument would cause such oscillation independently of the force which is being measured, thus disturbing the readings of the indicating member. The present invention provides a damper for such extraneously produced movements of the indicating member. It consists of the features and elements hereinafter described and shown in the drawings as indicated by the claim.

The instrument chosen for purposes of illustrating this invention is a speedometer of the magnetic type in which according to a well-understood principle, the continuous rotation of a magnet in proximity to a delicately poised element of non-magnetic but electrically-conductive material sets up a so-called "magnetic drag" tending to deflect the non-magnetic element away from a zero position toward which it is biased by a light spring.

Figure 1:
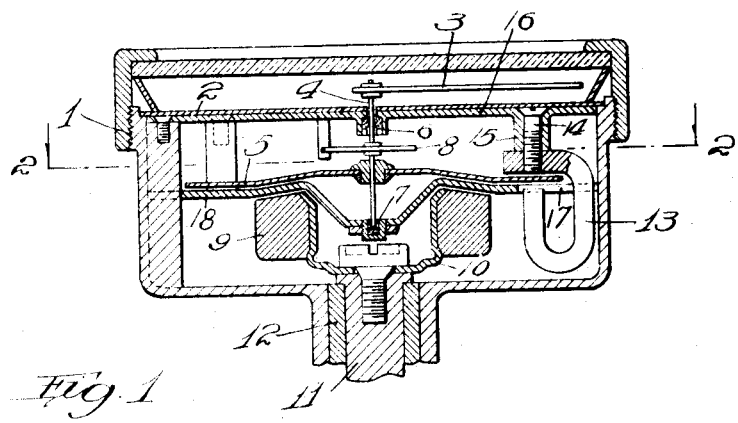
Figure 1 is a substantially axial section of a speed indicating instrument embodying this invention.
Figure 2:
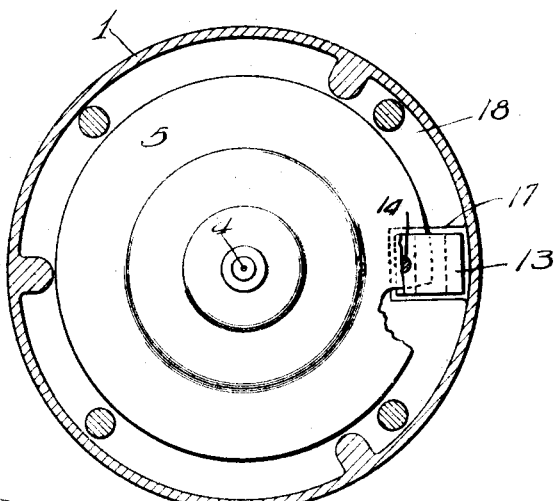
Fig. 2 is a trans-axial section taken as indicated at line 2—2 on Fig. 1.

Referring first to Fig. 1, it will be seen that the casing, 1, incloses a dial plate, 2, arranged to be traversed by an indicating hand or needle, 3, on a spindle, 4, which spindle also carries the non-magnetic and electrically-conductive element in the form of a disk, 5. The spindle is delicately poised in jewel bearings, 6 and 7, and is biased to a zero position by a hair spring, 8, which may be of the common spiral form usually employed for this purpose. Proximate to the non-magnetic disk 5, there is rotatively mounted a magnet, 9, preferably circular in form, and secured to a carrier, 10, which is fixed to the end of a shaft, 11, journaled in a bearing, 12, co-axially with respect to the spindle, 4.

As above suggested, the continuous rotation of magnet, 9, sets up a magnetic drag which tends to pull the disk, 5, around from a zero position by a distance or angle substantially proportional to the speed of rotation of magnet, 9, whereby the resulting position of the indicator needle, 3, upon a scale on dial plate, 2, can be interpreted to determine the speed of rotation of the shaft, 11, and of any other rotary element to which it is connected. But on account of the sensitive mounting of the spindle, 4, and the relative lightness of the hair spring, 8, any jarring or sudden bodily movement of the instrument or the mechanism on which it is carried might disturb the reading of indicator, 3, through the operation of inertia forces upon the disk, 5. To minimize the effect of such extraneous vibration or disturbance, a damper magnet, 13, of a modified horse-shoe type is mounted within the case, 1, with its two poles disposed respectively above and below the plane of the disk, 5, at its peripheral portion so that in its rotation this portion of the disk, 5, must always move in the air gap between the poles of said magnet, 13. The magnet is suspended by a securing screw, 14, in a lug, 15, of a diaphragm or partition wall, 16, just below the dial plate, 2, while its lower portion is accommodated in a specially formed slot or opening, 17, in the diaphragm or partition wall, 18, whose principal function is to support the jewel bearing 7, for the spindle, 4.

It will be evident that, just as the rotation of magnet, 9, with respect to disk, 5, sets up a magnetic drag tending to cause the disk, 5, to follow the magnet, 9, in its rotation, so the rotation or limited oscillation of disk, 5, with respect to the fixed magnet, 13, will set up a similar though less powerful drag, tending to arrest the movement of the disk, 5, and cause it to remain in fixed relation to the magnet 13, and this arresting or checking force, or drag, will be proportional to the speed of movement of the disk through the air gap of the magnet. Therefore, any sudden acceleration of the disk, 5, caused by shock or jar to the instrument from without will be automatically checked by a suddenly increased drag in the field of magnet, 13, though a very gradual rotation of the disk, 5, between the poles of said magnet, 13, will meet with scarcely any resistance. Hence, the normal shifting of the disk and indicator, 3, due to variations in the speed of shaft, 11, and its magnet, 9, will not be materially hampered by the presence of the damper magnet, 13; but the disk, 5, will be stabilized and protected from outside shock by said damper magnet.

It may be understood, of course, that the application of a damping device in the form of a magnet, such as that shown at 13, is not limited to an instrument of the magnetic type employing such a magnet as that shown at 9, for inducing the oscillation of the disk, 5; but that whatever form of mechanism is employed to produce the measuring movement of the disk, 5, or any corresponding member, such movement can be protected from extraneous vibration by the use of a damper magnet, if the speed responsive element is itself composed, or has associated with it, a member composed of non-magnetic, electrically-conductive material, so that movement of such material in the field of the damper magnet will set up the so-called Focault currents with their corresponding diminutive magnetic fields which are the basis of the magnetic drag relied upon for damping purposes.

I claim:

In a speed indicator which includes a speed-responsive element comprising a disk of non-magnetic electically-conductive material mounted to oscillate about its own axis; yielding means arranged to bias such disk to a zero position, rotary means adapted to deflect said disk from its zero position in accordance with the speed of such rotary means; two diaphragms at opposite sides of said disk, one proximate thereto and between the disk and the rotary means, and the other more remote therefrom, the disk having a spindle which is journaled in said diaphragms; a brake or damper comprising a permanent magnet in the form of a bar bent to extend one end portion across the direction of the other end and at a short distance therefrom to form the magnetic gap between the last mentioned end and the side surface of the transversely extending portion, said magnet being secured by said transversely bent end portion to the more remote of said diaphragms, the other diaphragm having an aperture through which the other end of the magnet extends opposite and proximate to the disk.

In testimony whereof, I have hereunto set my hand at Chicago, Illinois, this 7 day of February, 1918.

J. E. GENN